C. T. SMITH & F. A. AMES.
EXTENSION DEVICE FOR AUTOMOBILES.
APPLICATION FILED JAN. 13, 1917.
1,258,486.
Patented Mar. 5, 1918.
4 SHEETS—SHEET 2.
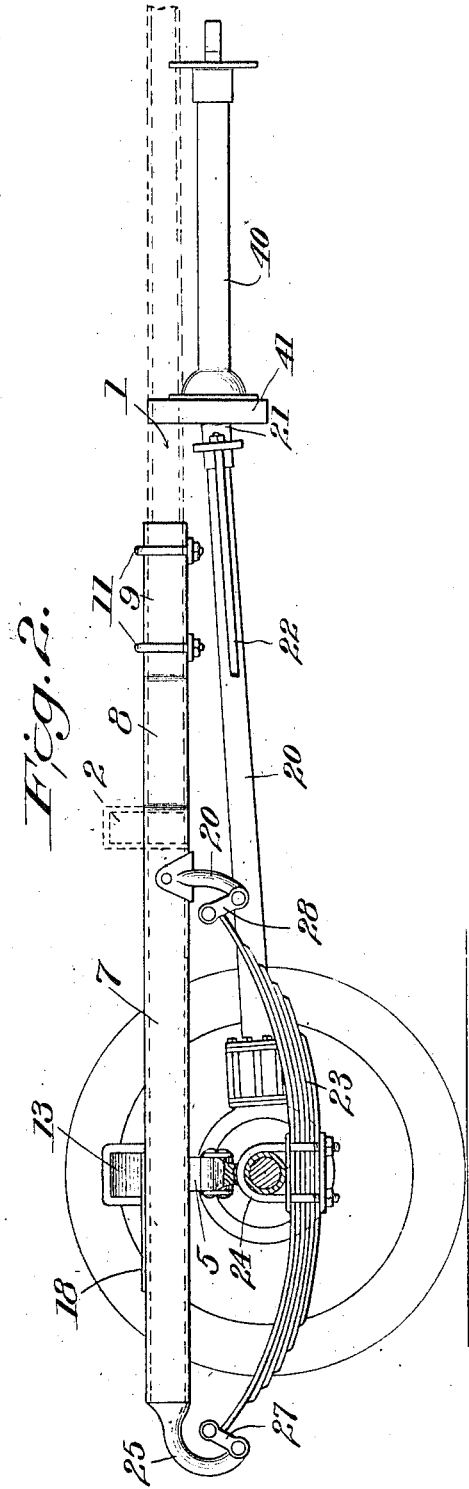
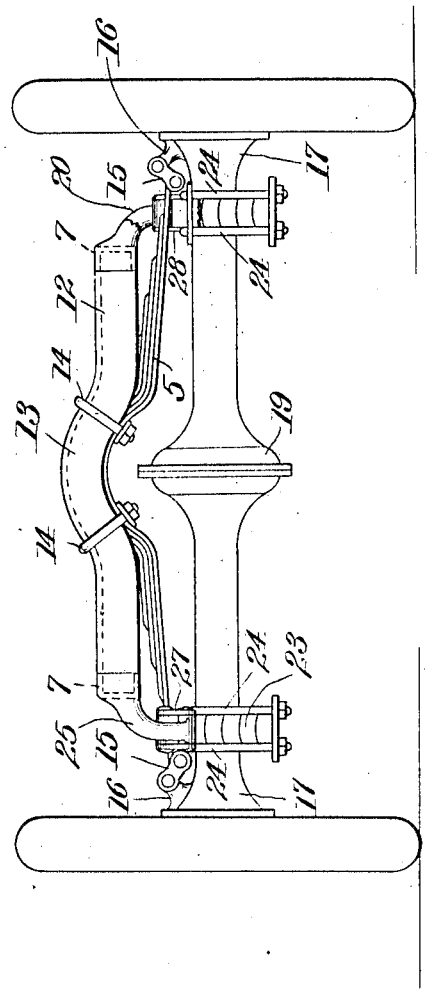
Inventors
C. T. Smith
F. A. Ames.
By
A. P. Greely
Attorney

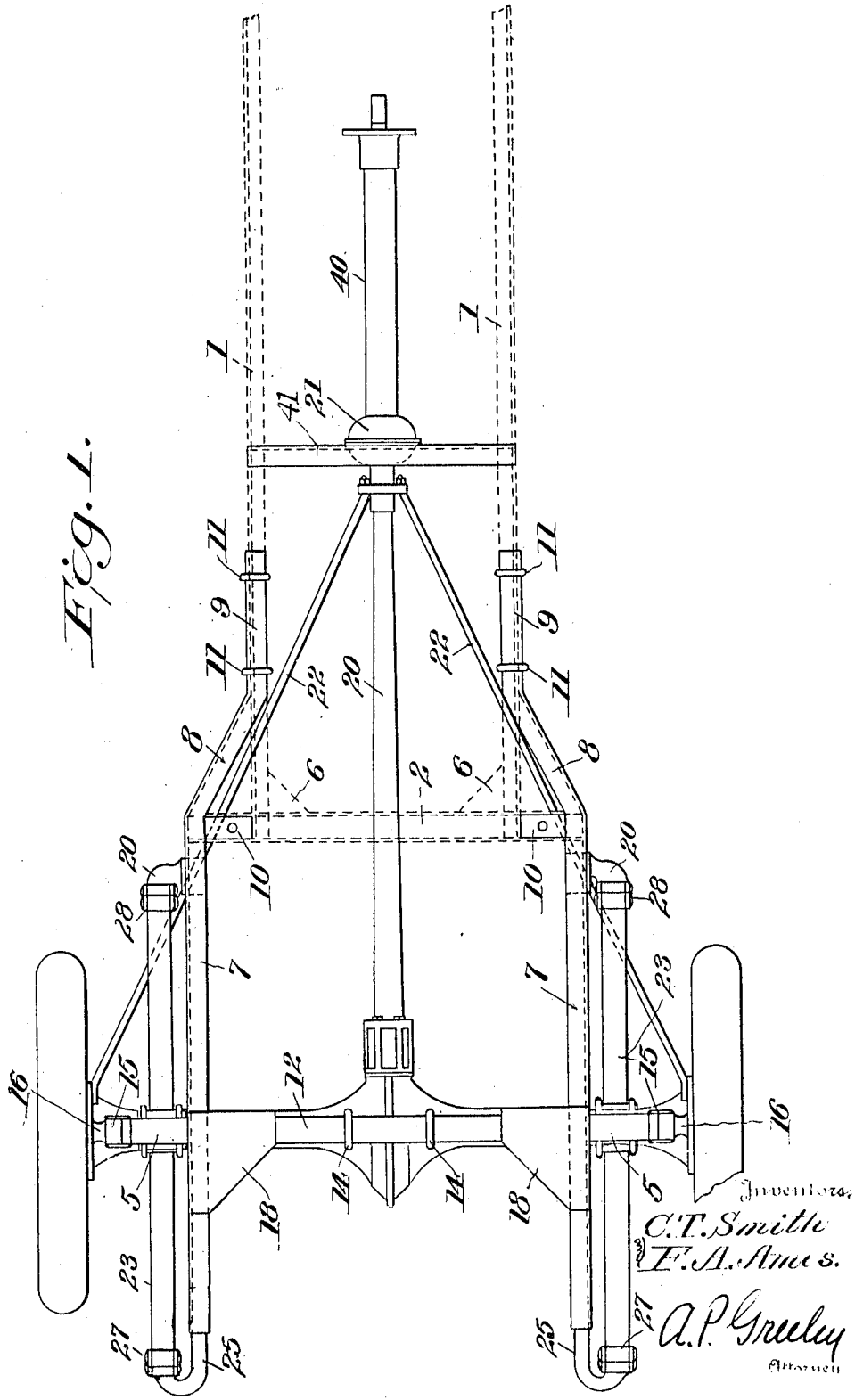

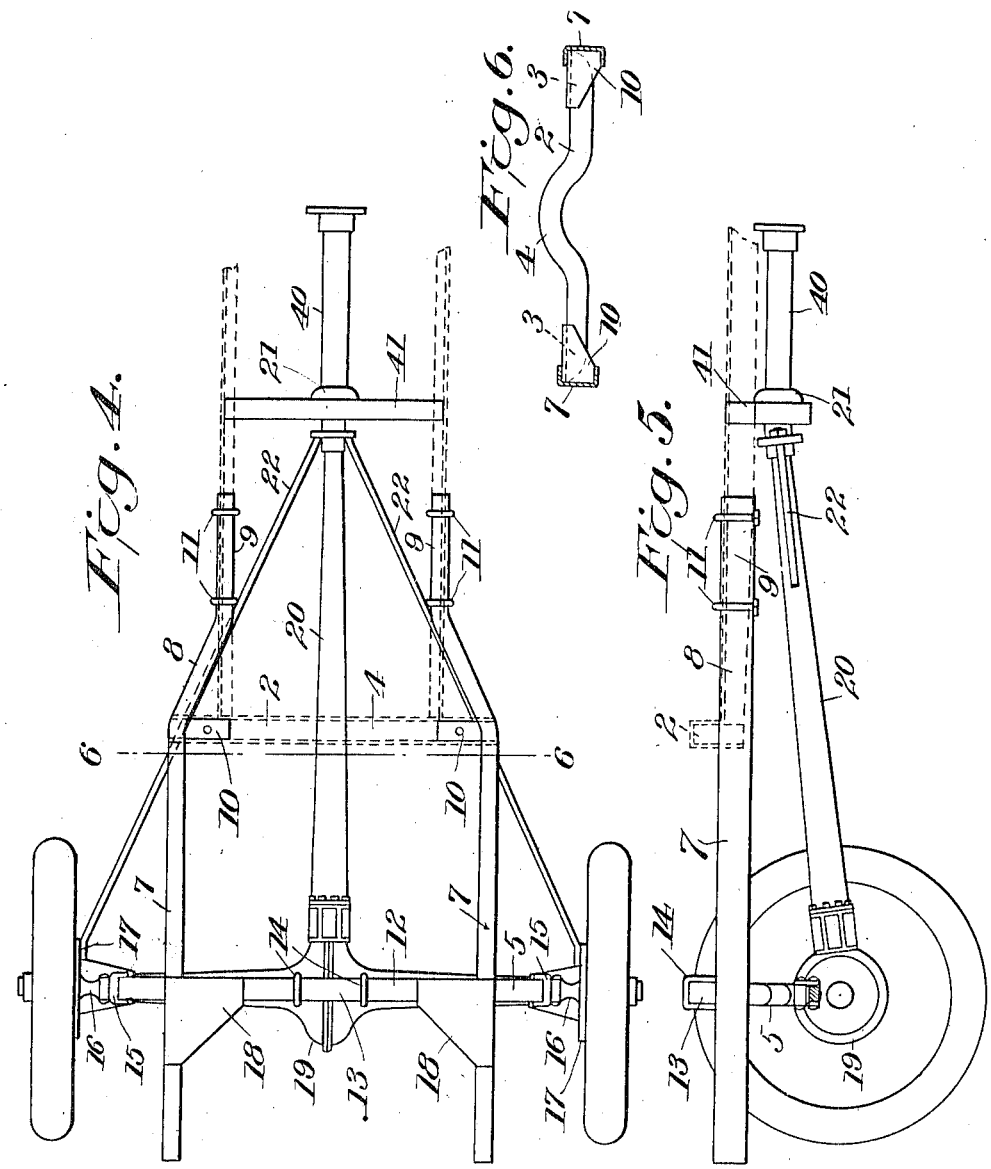

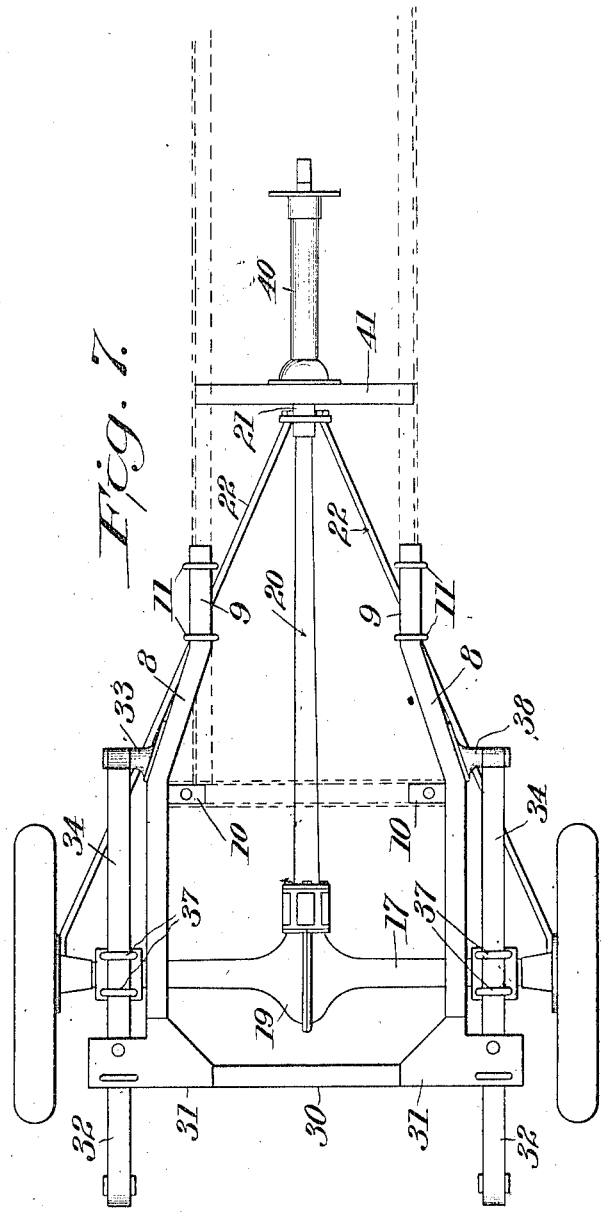
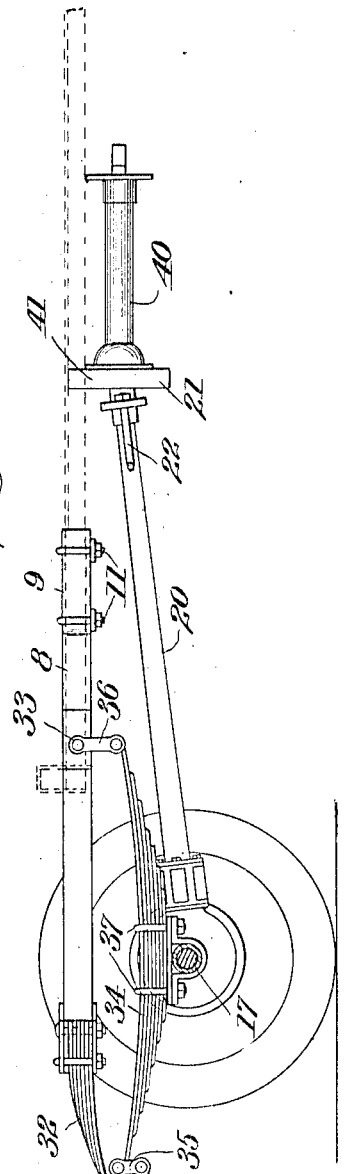

UNITED STATES PATENT OFFICE.

CHARLES T. SMITH AND FREDERIC A. AMES, OF OWENSBORO, KENTUCKY, ASSIGNORS TO THE F. A. AMES CO., OF OWENSBORO, KENTUCKY, A CORPORATION OF KENTUCKY.

EXTENSION DEVICE FOR AUTOMOBILES.

1,258,486.  Specification of Letters Patent.  Patented Mar. 5, 1918.

Application filed January 13, 1917. Serial No. 142,208.

*To all whom it may concern:*

Be it known that we, CHARLES T. SMITH and FREDERIC A. AMES, citizens of the United States, residing at Owensboro, in the county of Daviess, State of Kentucky, have invented certain new and useful Improvements in Extension Devices for Automobiles, of which the following is a description, reference being had to the accompanying drawings, forming a part hereof.

Our invention relates to extension devices for automobiles and has for its object to provide a simple, inexpensive and effective device by which the chassis of an automobile of relatively short wheel base may be extended to give a relatively long wheel base and which will permit of the use of the rear axle of the automobile without change.

Extension devices for automobiles are known in the use of which the rear axle of the automobile is removed and an extension carrying a rear axle with its driving mechanism is secured to the chassis for the purpose of converting the chassis of a pleasure car into an extended chassis suitable to carry a truck body. Such extension devices though useful involve the expense of the additional rear axle with its driving gearing.

In the extension device of our present invention the necessity of the additional rear axle and its driving gearing is avoided the device being adapted to have the rear axle of the automobile connected with it without change.

The chassis extended by the use of the device of our invention is adapted to receive either a truck body or a pleasure car body of greater length than that of the original automobile and to make by reason of its longer wheel base, the vehicle easier riding.

With the above explained objects in view our invention consists in the construction and combination of elements hereinafter described and claimed.

Referring to the drawings Figure 1 is a top plan view of an automobile extension device embodying our invention.

Fig. 2 is a side view of the same partly broken away, Fig. 3 is a rear view of the same partly broken away. Fig. 4 is a top plan view of a modified form in which the side springs shown in Figs. 1, 2 and 3 are dispensed with. Fig. 5 is a side view partly broken away of the modified form shown in Fig. 4.

Fig. 6 is a detail cross sectional view on line 6—6 of Fig. 4.

Fig. 7 is a top plan view of a further modification in which the cross spring is dispensed with and side springs different from those shown in Figs. 1, 2 and 3 are employed.

Fig. 8 is a side view of the construction shown in Fig. 7.

In the drawings 1, 1 indicates the side bars of the chassis of an automobile of ordinary construction such as the automobile commonly known as the "Ford," and 2 indicates the cross bars connecting the rear ends of the side bar, having ends 3, 3 extending beyond the side bars, this cross bar being bowed upward at its midlength at 4 (see Fig. 6) to receive the upwardly bowed middle portion of the usual cross spring 5. The junctions of the side bars with the cross bars are braced by corner plates 6, the construction thus far described being the ordinary construction of the rear portion of an automobile of the pleasure car type with the rear axle and its cross spring removed. The chassis is not cut or altered in any way.

7, 7 indicates the side bars of our extension device. These side bars are preferably formed of channel iron or pressed steel and are spaced apart for the main portion of their length a distance greater than the distance apart of the side bars 1, 1. Near their forward ends these side bars 7 are bent inward at an angle as shown at 8 to the lines of the side bars 1, 1 and at the forward ends of the inclined portions 8 the bars are extended forward as shown at 9 to lie along and inclose within them the side bars 1, 1. At the ends of the main portions of the side bars 7 just before they bend inward to form the inclined portions 8 the side bars are provided with inwardly extending plates 10 adapted to underlie and be secured to the ends 3 of the cross bar 2. The portions 9 of the side bars 7 are secured to the side bars 2 by clamps 11 or other convenient securing means.

The side bars 7, 7 in the construction shown in Figs. 1 to 6 inclusive are provided near and preferably to the rear of their midlengths with a cross bar 12 which is bowed upward at its midlength at 13 to receive the upwardly bowed portion of the cross spring 5 which is secured to it by clamps 14 or other convenient securing means.

The ends of the cross spring 5 are carried by links 15 which are carried by brackets 16 secured to the axle casing 17 near the wheels, the cross spring being thus, as is usual, in automobiles, above the axle. The cross bar 12 is secured to the side bars 7 and is preferably braced by corner plates 18.

The axle casing 17 is of usual construction being the axle casing of the automobile to which the extension is applied having the usual gear casing 19 midway between its ends from which extends forward the usual shaft casing 20 provided at its forward end with the usual casing 21 for the universal joint to which are secured the forward ends of the diagonal braces 22 the rear ends of which are secured to the axle casing 17 near its ends.

In the construction shown in Figs. 1, 2 and 3 which illustrate a form of our invention particularly adapted to receive a truck body, the side bars 7 are provided with side springs 23. These side springs are preferably leaf springs bowed downward to extend under the axle casing 17 to which they are secured by clamps 24. The side bars 7 in this construction are provided with end brackets 25 and side brackets 26 to which the ends of the springs 23 are connected by links 27 and 28 respectively.

By thus arranging the side springs so that they extend under the axle casing the clamps being beneath the cross spring 5 and well within its ends the cross spring and its usual connections to the axle casing can be used without change and its usual action is not interfered with. By the use of these side springs the extended chassis is adapted to carry a heavy load and the side bars 7 of the extension being spaced apart a distance substantially greater than the distance apart of the side bars 2 of the automobile a much wider body can be carried than could be carried by the automobile chassis.

In the construction shown in Figs. 4 and 5 the side springs and the brackets which carry them are dispensed with, the construction being otherwise the same as above described. In this construction the weight of the rear end of the frame and the body carried by it is supported by the cross spring 5 which, of course, is not adapted to support as heavy a load as is the construction above described in which the additional side springs are used. This construction, however, gives a lengthened wheel base and is of advantage in making the vehicle easier riding if used as a pleasure vehicle and in adapting the automobile to support the longer body needed for a light truck or delivery wagon.

In Figs. 7 and 8 we have shown a further modification in which the cross spring of the automobile rear axle is dispensed with and side springs different from those above described in connection with Figs. 1, 2 and 3 are used.

In this construction the rear ends of the side bars 7, 7 are connected by a cross bar 30 braced by corner plates 31. To the rear ends of the side bars 7 are secured half leaf springs 32 and to the side bars near their forward ends are secured posts or brackets 33. To the ends of the half springs 32 and to the posts or brackets 33 are secured the ends of leaf springs 34 by links 35 and 36. These leaf springs 34 extend above the axle casing and are secured to it by clamps 37.

This construction shown in Figs. 7 and 8 gives the lengthened wheel base thus making the vehicle easier riding and also gives the advantage of the side spring support which aids in making the vehicle easier riding and also gives a better support for a wider body than is afforded by the use of the cross spring alone as in Figs. 5 and 6.

In order to permit of the use of the rear axle and driving means of the automobile it is, of course, with our extension device, necessary to connect the front end of the driving shaft with the engine shaft. For this purpose we use a short shaft carried in a casing 40 and support the forward end of the casing of the driving shaft by a cross bar 41 carried by the side bars 2, 2 of the automobile chassis.

In all of the constructions shown the side bars of the extension being wider apart than the side bars of the automobile chassis give a better foundation or support for the body and are adapted to support a wider body than can be carried on the automobile chassis and in the construction in which side springs are used these side springs are secured to the side bars of the extension and not to the body.

It will, of course, be understood that we do not desire to be limited to the precise construction or arrangement shown and described as it is obvious that such construction and arrangement may be varied without departing from the spirit of the invention.

Having thus described our invention what we claim is:

1. An extension frame for automobile chassis having side bars adapted at their forward ends to be secured to the side bars of the automobile chassis, extending outward and rearward from their attachment to the side bars of the automobile chassis and thence extending rearward parallel with the lines of the side bars of the automobile chassis but at a distance apart greater than the distance between the side bars of the automobile chassis, a cross bar connecting said rearwardly extending portions of the side bars and means for supporting them above the axle casing, comprising side springs having their ends connected to the side bars and having their middle portions secured to the axle casing and a cross spring having its middle portion secured to the cross bar and having its ends connected with the axle casing near its ends.

2. An extension frame for automobile chassis having side bars adapted at their forward ends to be secured to the side bars of the automobile chassis, extending outward and rearward from their attachment to the side bars of the automobile chassis and thence extending rearward parallel with the lines of the side bars of the automobile chassis but at a distance apart greater than the distance between the side bars of the automobile chassis, a cross bar connecting said rearwardly extending portions of the side bars and means for supporting them above the axle casing, comprising side springs having their ends connected to the side bars and having their middle portions secured to the axle casing and a cross spring having its middle portion secured to the cross bar and having its ends connected with the axle casing near its end, the side springs extending below the axle casing and the cross spring being above the axle casing.

3. The combination with an automobile chassis including the usual operative frame and having its rear axle and wheels removed, of an extension frame secured to the automobile frame and extending rearwardly thereof comprising side bars spaced apart a distance greater than the width of the automobile chassis, having their forward ends bent inward to extend along and be secured to the side bars of the automobile chassis, a cross bar connecting the side bars of the extension frame and means for supporting the extension frame from the rear axle of the automobile comprising a cross spring secured at its middle to the cross bar of the extension frame and having its ends connected to the axle casing near its ends and side springs having their ends connected to the side bars and having their middle portions extending below and secured to the axle casing.

In testimony whereof we affix our signatures this 11th day of January 1917.

CHAS. T. SMITH.
FREDERIC A. AMES.